United States Patent Office
3,428,613
Patented Feb. 18, 1969

3,428,613
METHOD FOR SYNTHESIS OF ADDUCTS
John E. Harris, Hyde Park, Mass., and Clifford N. Matthews, St. Louis, Mo., assignors to Monsanto Research Corporation, St. Louis, Mo., a corporation of Delaware
No Drawing. Filed Aug. 7, 1964, Ser. No. 388,309
U.S. Cl. 260—78.4  8 Claims
Int. Cl. C08f 3/74; C07c 121/30, 121/02

ABSTRACT OF THE DISCLOSURE

A method for synthesizing adducts of tetracyanoethylene with amines. The method involves the reaction of tetracyanoethylene with tertiary amines to produce adducts which can be pyrolyzed to produce heat stable polymers useful as heat-stable materials of construction.

---

This invention relates to a method of synthesis, and more particularly, provides a novel method for the synthesis of cyanocarbon amine adducts.

It has been recognized that tetracyanoethylene forms adducts with amines which are charge transfer complexes usually containing a 1:1 molar ratio of amine to tetracyanoethylene. However, the method of synthesis of such compounds starting from tetracyanoethylene has not led to many preparations of members of this class of materials. Tertiary aliphatic amines were at first reported not to react with tetracyanoethylene at all, although a subsequent publication has described formation of salts (rather than adducts), by a reaction in which the amine acquires a proton from the solvent to become an ammonium ion. A complex adduct of tetracyanoethylene with pyridine has been reported in solution, but the characteristics of the isolated compound have not been published.

It is an object of this invention to provide a novel method of synthesizing adducts of tetracyanoethylene with amines.

A particular object of this invention is to provide a novel method of synthesizing adducts of tetracyanoethylene with amines by reaction of amines with a malononitrile compound.

Another object of this invention is to provide a novel method of producing heat-stable polymers.

These and other objects will become evident upon consideration of the following specification and claims.

It has now been found that the reaction of a tertiary amine with a halomalononitrile provides cyanocarbon amine compounds, and that these are adducts of tetracyanoethylene with tertiary amines.

This is an unpredictable and unexpected course of reaction. The dehydrohalogenation of negatively substituted methanes is known to produce carbenes, which are divalent radicals of the formula: CRR' where R and R' are substituents such as cyano and carbalkoxy radicals. These divalent radicals are highly reactive species. They may combine with each other, forming polymers, or if the carbenes are formed in the presence of some different reactive compound such as an olefin, they will react with it, forming addition products. (See J. Org. Chem., vol. 25, page 2078, for example.)

It is known that compounds can be formed which are addition products of tertiary amines with divalent radicals such as carbenes. The resulting compounds are known as ammonium ylides. Dicyanomethylene ammonium ylides are known, such as $(CH_3)_3N^\oplus — ^\ominus C(CN)_2$ (or $(CH_3)_3N=C(CN)_2$)

The reaction of diethyl bromomalonate with a tertiary amine proceeds to form such an ammonium methylene ylide:

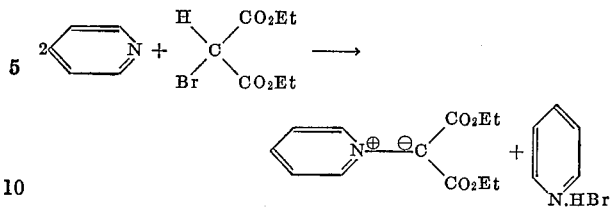

Surprisingly, however, the reaction of a halomalononitrile with a tertiary amine has now been found to produce a tetracyanoethylene amine adduct, rather than a methylene ylide. The reaction is illustrated by the following equation.

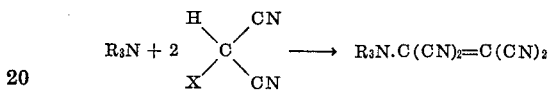

The identity of the products can be shown by comparison with compounds produced from tetracyanoethylene and amines. They have the formula of 1:1 adducts corresponding to 1:1 charge transfer complexes. These compounds can be formulated as charge transfer complexes

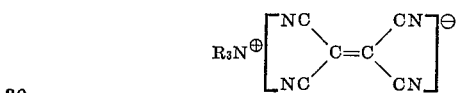

or as tetracyanoethylene ylides

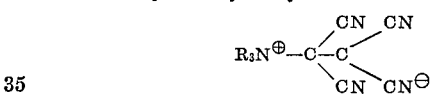

but in any case, they are tetracyanoethylene amine adducts.

The presently provided method accordingly affords a new and advantageous route to tetracyanoethylene amine adducts.

Further, it has been found that the tetracyanoethylene amine adducts produced by the present method can be converted by pyrolysis under vacuum to novel, heat-stable polymers. The sintered product of the pyrolysis can be employed as a heat-stable material of construction, for example.

In the practice of the present invention to produce tetracyanoethylene amine adducts, useful halomalononitrile starting materials are compounds of the formula

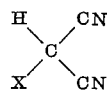

where X is a halogen atom with an atomic weight of from 35 to 80, that is, a halogen selected from chlorine and bromine. Bromine is the particularly preferred halogen.

A wide variety of tertiary amines, including aliphatic and heterocyclic amines, may be used in the practice of the present invention. Illustrative, for example, of the presently useful trialkyl amines are trimethyl amine, triethyl amine, tripropyl amine, tributyl amine, methyldiethyl amine, dimethylethyl amine, dimethylisopropyl amine, dimethyl-t-butyl amine, dimethyl-n-amyl amine, dimethyl-n-decyl amine, triamyl amine, tri-n-propyl amine, tri-n-butyl amine, tri-t-butyl amine, tri-s-butyl amine and the like.

Further, the presently useful amines comprise tertiary amines having an exocyclic nitrogen atom including carbocyclic rings, such as dimethylcyclohexyl amine, dimethylcyclopentyl amine, methyldicyclohexyl amine, dimethylbenzyl amine, tribenzyl amine, diethylphenethyl amine, dimethylphenyl amine and the like.

Still another group of presently contemplated amines are heterocyclic tertiary amines in which the nitrogen atom forms part of an otherwise carbocyclic ring. These may be rings having an aliphatic character such as quinuclidine, N-methylpiperidine, N-ethylpiperidine, N-methyl-1,2,3,4-tetrahydroquinoline, N-methylmorpholine, N-methylpyrrolidine, N-methylpyrrole, N-methylindole, N-methylcarbazole, N-methylpyrroline, N-methylpyrrolidine, N-methylhexahydrocarbazole, and the like.

Still a further group of presently contemplated tertiary amines comprises the heterocyclic amines in which the nitrogen atom is part of a carbocyclic ring with aromatic (conjugated) unsaturation. Such amines are illustrated for example by pyridine, 2-picoline, 3-picoline, 4-picoline, 2,6-lutidine, 3,5-lutidine, 2,4,6-collidine, quinoline, isoquinoline, quinaldine, lepidine, acridine, phenanthridine, 2-methyl-5-ethylpyridine, 8-methylquinoline and the like.

Still a further presently contemplated group of compounds includes the poly-tertiary amines which contain two or more tertiary amine groups. These include, for example, aliphatic polyamines such as tetramethylhexamethylene diamine, pentamethyldiethylene triamine, octamethylethylene tetramine, and so forth. Further, they include alicyclic amines such as tetramethyl phenylene diamine, 1,4-naphthylene diamine, tetramethyl cyclohexylene diamine, and the like.

Still further, they include polyamino N-heterocyclic compounds, which may be monocyclic such as pyrimidine, pyrazine and so forth, or polycyclic such as quinoxaline, phenazine and the like, as well as aliphatic polycyclic compounds containing more than one nitrogen atom in a carbocyclic ring such as hexamethylene-tetramine, 1,4-diazabicyclo[2.2.2]octane and so forth.

The present process is usually conducted by contacting a monohalomalononitrile with a tertiary amine in a reaction medium comprising a solvent or diluent, although direct contact of the reactants, without solvent or diluent, is also feasible.

The reaction mixture should be substantially anhydrous. Solvents and diluents which are liquid at low temperatures, below 0° C., are preferred. Useful solvents and diluents are generally organic liquids in which at least one of the reactants is fairly soluble (solubility above 10 g./liter at the temperature of the reaction), and which are inert toward the reactants. Suitable inert organic liquids include, for example, ethers such as dimethoxyethane, diethyl ether and tetrahydrofuran, and other fluids with low dielectric constants (below 10) such as benzotrifluoride.

Reaction of a tertiary amine with a monohalomalononitrile in accordance with this invention appears to involve dehydrohalogenation of the halomalononitrile. The hydrogen halide thus formed can add to the tertiary amine in the reaction mixture to form the corresponding amine hydrohalide, as will be appreciated from a consideration of the equations:

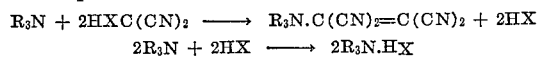

$$R_3N + 2HXC(CN)_2 \longrightarrow R_3N.C(CN)_2=C(CN)_2 + 2HX$$
$$2R_3N + 2HX \longrightarrow 2R_3N.HX$$

The desired reaction to form the charge transfer complex of tetracyanoethylene with an amine will consume only one mole of amine for each 2 moles of halomalononitrile, but formation of the hydrohalide of the amine, $R_3N.HX$, can thus consume two additional moles of the amine in the course of this reaction.

It may accordingly be desirable to operate using an excess of amine over the theoretical ratio of one mole to two moles of the malononitrile. However, it has been found that use of a ratio sufficient to provide for the stated hydrohalide formation, consuming a total of 3 moles of amine per mole of product, is not necessary. Thus, varying ratios of the reactants may be used if desired, such as an amine-to-halomalononitrile molar ratio extending through the range of from 1:10 to 10:1 or more.

Further, in connection with the provision of available amine in the reaction mixture, it is sometimes advantageous to conduct the present reaction in the presence of added base. This is particularly desirable where the amine is itself a very strong base, such as triethylamine (pK 3.25, K=activity constant), with strong ionizing tendencies. Suitable bases for addition to the reaction mixture in this connection are weak bases such as salts of alkali metals with weak acids, as exemplified by potassium carbonate, sodium acetate and the like. The amounts to be used can vary: about 1 mole per mole of the halomalononitrile may be employed, for example, or more or less than this proportion, depending on the reaction mixture composition.

The reaction temperature may vary through a wide range, such as from —100° C. to +100° C. It is especially advantageous to operate at below room temperature (that is, below 20–25° C.), and particularly, in the range from —20° to —100° C. The reaction is complete in a few hours, generally, at these temperatures, and good control of the reaction is secured. In general, atmospheric pressure provides suitable conditions for the reaction, although the pressure may if desired be varied, through the range from subatmospheric pressure as low as 0.5 mm. Hg, for example, to superatmospheric pressures as high as 500 pounds per square inch, for example. Usually the reaction mixture is desirably protected from access of air by a blanket of inert gas such as nitrogen, argon, or the like.

The course of the reaction may be followed by following the disappearance of the halomalononitrile from the reaction mixture, and usually, by observing the precipitation of the amine hydrohalide from the organic reaction mixture.

For the isolation of the tetracyanoethylene compound from the reaction mixture, the reaction product is separated from other components of the reaction mixture by usual procedures, such as filtration, extraction and the like. In recovering the reaction product from the reaction mixture, depending on factors such as solubility of the reaction product and of the amine hydrohalide in the reaction medium, water-sensitivity of the products and the like, it is sometimes useful to treat the reaction mixture with aqueous base, thus releasing the free amine from its hydrohalide salt. For this purpose, useful bases are strong inorganic bases forming halides with good water solubility, such as NaOH and KOH: the alkali metal halide formed (and any excess base) dissolves in the aqueous layer, and the organic layer containing the desired product can be conveniently separated for further treatment.

The reaction product usually is recovered as a halogen-containing complex of the tetracyanoethylene amine adduct, which apppears to be a complex of the adduct with the amine hydrohalide in the reaction mixture. The desired adduct is separated from this complex by recrystallization, from water or from organic solvents.

The invention is illustrated but not limited by the following examples, in which all temperatures are degrees centigrade unless otherwise indicated.

Example 1

This example illustrates the reaction of monobromomalononitrile with pyridine to produce a charge transfer complex of tetracyanoethylene.

A mixture of 15.8 grams (g.) (0.2 mole) of pyridine and 60 milliliters (ml.) of dimethoxyethane is added to 14.5 g. (0.1 mole) of monobromomalononitrile in 100 ml. of dimethoxyethane, at —22° C., under nitrogen. The resulting mixture is stirred for 15 minutes, and then 300 ml. of diethyl ether is added. A precipitate separates, which is filtered off, washed with ether and dried. Its dry weight is 12 grams.

A portion of the stated precipitate is recrystallized from water by dissolving it in water at 50°, cooling the aqueous solution in ice, and filtering off the resulting precipitate. The product is a purple, needle-shaped crystalline precipitate, M. 156–7°.

Separately, another preparation is conducted by adding 31.6 g. (0.4 mole) of pyridine in 60 ml. of dimethoxyethane to 30 g. (0.2 mole) of bromomalononitrile in 100 ml. of dimethoxyethane at −22°, the addition time being one hour. The resulting reaction mixture is kept at −22° to −28° overnight and then filtered. The filtrate is evaporated down to leave a dark solid. This solid is recrystallized from a chloroform/carbon tetrachloride mixture. The yellow-brown recrystallized, dried material (M. 84–86°) is recrystallized from water.

The above-described products of the two preparations, recrystallized from water, are combined and the combined products are recrystallized successively from water, isopropanol and water. The resulting product melts at 161–162.5° and analyzes correctly for a compound with the composition of an adduct of one molecule of pyridine with one tetracyanoethylene molecule, as expressed by the formula

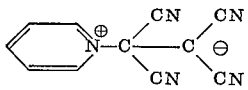

Calcd. for $C_{11}H_5N_5$: C, 63.76; H, 2.43; N, 33.81. Found: C, 64.01; H, 2.56; N, 33.35.

For comparison, a complex of tetracyanoethylene with pyridine is prepared by slow addition of 1.3 g. (0.1 mole) of tetracyanoethylene in 25 ml. of acetonitrile, to 0.8 g. (0.1 mole) of pyridine in 25 ml. of acetonitrile, at −22°, under nitrogen. After 2 hours stirring, the solution is concentrated on a flash evaporator. The residue (M. 84–100°) is dissolved in isopropanol, and this solution is filtered and evaporated to dryness, providing the 1:1 molar adduct of tetracyanoethylene with pyridine as purple crystals, M. 150–154° C. A methylene dichloride solution of this adduct has an ultraviolet spectrum with absorption at 400 m$\mu$, $\epsilon=1.4\times10^4$, and 420 m$\mu$, $\epsilon=1.4\times10^4$.

The ultraviolet spectrum of a methylene dichloride solution of the reaction product of bromomalononitrile with pyridine, prepared as described above, exhibits similar absorption, at 400 m$\mu$, $\epsilon=1.6\times10^4$, and 420 m$\mu$, $\epsilon=1.6\times10^4$.

The infrared spectrum of the tetracyanoethylene product has peaks at 3.15$\mu$ (m.), 3.18$\mu$ (m.), 3.28$\mu$ (m.), 4.75$\mu$ (s.), and 6.25$\mu$ (m.). The infrared spectrum of the reaction product of bromomalononitrile has similar absorption peaks at 3.12$\mu$ (m.), 3.17$\mu$ (m.), 3.25$\mu$ (m.), 4.57$\mu$ (s.), 6.1$\mu$ (m.), and 6.24$\mu$ (m.).

For further comparison, pyridinium tetracyanoethylenylide of the formula

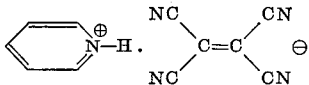

is prepared. Adding 3.0 g. 0.018 mole) of potassium iodide to 1.7 g. (0.013 mole) of tetracyanoethylene in 50 ml. of acetonitrile and then adding benzene precipitates potassium tetracyanoethenylide. A solution of 1.0 g. (0.06 mole) of the potassium tetracyanoethenylide in 10 ml. of acetonitrile is added slowly to 0.63 g. (0.06 mole) of pyridine hydrochloride in 10 ml. of acetonitrile, under nitrogen, cooled to −22°. The mixture is allowed to warm to room temperature, stirred for 3 hours, and filtered to remove potassium chloride. The mother liquid is concentrated to provide pyridinium tetracyanoethenylide as a purple solid, M. 84–90°. The ultraviolet spectrum of a solution of this compound in methylene dichloride shows absorption at 400 m$\mu$, $\epsilon=5.5\times10^3$ and 420 m$\mu$, $\epsilon=5.2\times10^3$, and the infrared spectrum has peaks at 3.28 $\mu$ (m.), 4.56 $\mu$ (s.), 6.25 $\mu$ (s.), and 6.65 $\mu$ (s.), both of which spectra are distinctly different from those of the reaction product of pyridine and bromomalononitrile.

Accordingly, the reaction product of pyridine and bromomalononitrile is identified as the 1:1 molar ratio adduct of tetracyanoethylene and pyridine.

Example 2

This example also illustrates the reaction of pyridine with bromomalonitrile to give a compound of tetracyanoethylene with pyridine.

A 10 gram portion of the product of the first preparation described in Example 1 is placed in a Soxhlet extractor thimble and extracted with methylene dichloride. The residue is about 8 grams of yellowish material, which is recrystallized then from isopropanol to give a brown product melting at 117–118°. Data provided by tests such as elementary analysis and infrared spectra indicate that this material, isolated using non-aqueous solvents, may be an adduct of one mole of tetracyanoethylene with one mole of pyridine and one mole of pyridine hydrobromide.

A portion of this product is again recrystallized from isopropanol, and then recrystallized from water warmed to 60–65°. The product which crystallizes out from water has the form of purple crystals, and melts at 160–161.5°. This final product is the 1:1 molar adduct of tetracyanoethylene with pyridine.

Example 3

This example describes still another preparation of a tetracyanoethylene compound by reaction of pyridine with bromomalonitrile.

A mixture of 11.8 g. of pyridine and 12 ml. of dimethoxyethane is added rapidly to 14.5 g. of bromomalononitrile in 50 ml. of dimethoxyethane, at −22°, under nitrogen. After 35 minutes, a precipitate has appeared. The reaction mixture is mixed with 300 ml. of diethyl ether ("ether"). The resulting mixture is filtered, and the solid thus separated is Soxhlet-extracted with methylene dichloride. The resulting brown solid is recrystallized from 40 ml. of isopropanol to provide 4.3 g. of material melting at 117–119°.

The procedure described in the preceding paragraph is repeated, but using only 25 ml. of dimethoxyethane to dissolve the 14.5 g. of bromomalononitrile, and adding 200 ml. of ether 10 minutes after the addition of the pyridine. The ethereal mixture is stirred 15 minutes and then filtered. The filtrate is evaporated to dryness, and the residue is washed with benzene and dried. This residue, M. 180–188°, is shown by spectral analysis to consist chiefly of pyridine hydrobromide. The solids in the ethereal mixture, separated from this filtrate, are dried and then recrystallized, to provide material melting at 108–113°, with spectral characteristics like those of the M. 117–119° product described in the preceding paragraph.

The products melting at 108–113° and at 117–119° prepared as described in the above two paragraphs are combined with some of the material melting at 117–118° produced as described in Example 2, and the combined samples are recrystallized from water. The resulting product is the 1:1 molar adduct of tetracyanoethylene with pyridine, M. 161–162.5°.

Example 4

This example describes another preparation of a tetracyanoethylene compound by reaction of pyridine with bromomalonitrile, using ether as solvent.

A solution of 7.9 g. (0.1 mole) of pyridine in ether is added slowly to a solution of 14.5 g. (01. mole) of bromomalononitrile in ether, at −22°, under nitrogen. The reaction mixture is left standing overnight at room temperature (70° F.) under nitrogen, and then evaporated to remove the solvent. The residue is dried to provide product, M. 117–119°, which can be recrystallized from water to produce the tetracyanoethylene 1:1 molar adduct with pyridine.

Example 5

This example illustrates still another preparation of a tetracyanoethylene compound by reaction of pyridine with bromomalononitrile.

A mixture of 19.8 g. (0.25 mole) of pyridine and 25 ml. of dimethoxyethane is slowly added to 14.5 g. of bromomalononitrile in 75 ml. of dimethoxyethane, at −75° C. The reaction mixture is let warm to −10°, the precipitated pyridine hydrobromide in the reaction mixture is removed by filtration, and the filtrate is concentrated to provide a solid residue which is recrystallized from isopropanol. This product, which melts at 114–117°, can be recrystallized from water to produce the tetracyanoethylene 1:1 molar adduct with pyridine.

Example 6

This example describes another reaction of pyridine with bromomalononitrile to produce a tetracyanoethylene compound, conducted without solvent.

Dry bromomalononitrile (14.5 g.) is added to 75 ml. of pyridine, at −22°, under nitrogen. After about an hour, the mixture is diluted with 200 ml. of ether, producing separation of a brown solid which is filtered off and dried. Recrystallization of this solid from water provides the purple-colored 1:1 molar adduct of tetracyanoethylene and pyridine.

Example 7

This example describes another reaction of pyridine with bromomalononitrile to provide a tetracyanoethylene compound.

A mixture of 15.8 g. of pyridine (0.2 mole) with 30 ml. of dimethoxyethane is added rapidly to 14.5 g. (0.1 mole) of bromomalononitrile in 50 ml. of dimethoxyethane, −22°, under nitrogen. After an hour, the reaction mixture is allowed to warm slowly to 20–25° and let stand overnight at this temperature under nitrogen. The liquid layer is then decanted off from the solids in the reaction mixture and concentrated. Ether is added to the resulting brown oil, producing a red solid which is separated and dried. This solid is a bromine-containing precursor of the 1:1 molar adduct of tetracyanoethylene and pyridine; recrystallization from water gives the stated adduct, M. 160–162°.

Example 8

This example illustrates another preparation of a tetracyanoethylene compound by reaction of pyridine with bromomalononitrile.

A solution of 14.5 g. of bromomalononitrile in 50 ml. of dimethoxyethane is slowly dropped into 15.8 g. of pyridine in 50 ml. of dimethoxyethane at −22° under nitrogen. The reaction mixture is stirred at −22° for a half hour and then filtered cold. The filtrate is allowed to warm to room temperature and then filtered again. The resulting filtrate is concentrated, giving a brown solid. The stated solid and the precipitate filtered off after warming the first filtrate to room temperature are combined and recrystallized twice from water at below 50°. The product is 3.5 g. of purple crystals melting at 161–162.5°, which is the compound of tetracyanoethylene with pyridine, in a 1:1 molar ratio.

Example 9

This example illustrates preparation of a tetracyanoethylene compound with a tertiary aliphatic amine, by reaction of a tertiary aliphatic amine with bromomalononitrile.

A solution of 14.8 g. (0.25 mole) of trimethylamine in 25 ml. of dimethoxyethane is added gradually to a solution of 14.5 g. (0.1 mole) of bromomalononitrile in 75 ml. of dimethoxyethane, with the system maintained at −75° C. and under a nitrogen blanket. Trimethylamine hydrobromide separates as a yellow solid. The heterogeneous mixture is stirred for one hour at −75°, and then poured into 150 ml. of water containing 5 g. (0.125 mole) of sodium hydroxide. The resulting solution is extracted with 150 ml. of chloroform. Concentration of the chloroform extract gives 4 g. of yellow solid product, and concentration of the aqueous layer produces precipitation of 2 more g. of yellow crystals. Recrystallization from methylene chloride gives the product, which is the adduct of trimethylamine with tetracyanoethylene, obtained as yellow crystals, M. 166–167° C. The ultraviolet spectrum of a methylene dichloride solution of this product exhibits absorption at 400 m$\mu$, $\epsilon$=5.2×10$^3$ and 420 m$\mu$, $\epsilon$=5.2×10$^2$. The infrared spectrum has absorption peaks at 3.20 $\mu$ (s.), 4.60 $\mu$ (s.), 6.65–6.80 $\mu$ (s.), and 7.23 $\mu$ (m.). The elemental analysis is in agreement with the designated formula:

Calcd. for $C_9H_9N_5$: C, 57.75; H, 4.85; N, 37.12. Found: C, 59.23; H, 4.83; N, 35.50.

Example 10

This example illustrates another reaction of trimethylamine with bromomalononitrile.

A mixture of 14.8 g. (0.25 mole) of trimethylamine in dimethoxyethane is added slowly to a solution of 14.5 g. of bromomalononitrile in dimethoxyethane, cooled to −75° C., under nitrogen, over a period of one hour. The reaction mixture is stirred for another hour and filtered. The mother liquor is mixed with an 0.5% aqueous NaOH solution. A brown solid separates which melts at 140–148°. This reaction product can be recrystallized to provide the substantially pure product which is the adduct of tetracyanoethylene with trimethylamine.

Example 11

This example further illustrates the reaction if trimethylamine with bromomalononitrile.

58 g. of trimethylamine in 100 ml. of dimethoxyethane is added to 58.2 g. of bromomalononitrile in 400 ml. of dimethoxyethane at −75° C. A bright yellow precipitate appears. After 2½ hours, the reaction mixture is poured into aqueous NaOH and the alkaline mixture is concentrated on a flash evaporator. The resulting solid is extracted with isopropanol. Concentration of the extract provides the reaction product, which can be recrystallized to provide the substantially pure adduct of tetracyanoethylene with trimethylamine.

Example 12

This example illustrates preparation of the tetracyanoethylene adduct of another tertiary aliphatic amine.

A mixture of 10.1 g. (0.1 mole) of triethylamine, 35 g. (0.25 mole) of potassium carbonate and 50 ml. of dimethoxyethane is cooled to −75° C., and then 29.0 g. (0.2 mole) of bromomalononitrile in 50 ml. of dimethoxyethane is added. The mixture is stirred for 3 hours, and then 200 ml. of methanol is added, which dissolves the yellow organic precipitate in the mixture. The insoluble inorganic salts are removed by filtration. Concentration of the filtrate yields a dark purple oily residue which on trituration with ether yields a solid, M. 222° C. (decomp.) that can be recrystallized from a mixture of ethanol and ethyl acetate.

The elemental analysis agrees with that calculated for the tetracyanoethylene adduct of triethylamine:

Calcd. for $C_{12}H_{15}N_5$: C, 62.86; H, 6.60; N, 30.55. Found: C, 61.42; H, 5.84; N, 30.2.

Example 13

This example illustrates the pyrolysis of the presently provided compounds.

The violet-colored pyridine-tetracyanoethylene complex prepared as described in Example 1 from bromomalononitrile, M. 161–162.5° C., is heated to 325° C. in vacuum in a sublimator for 1 hour. The weight loss is 20% and the vaporized material, which is condensed in a cold trap, is shown to be pyridine by its infrared spectrum. The residual purple-black solid does not melt when heated to 600° C. It is a polymeric product which is resistant to attack by inorganic acids. The density is 1.47–1.50. Analysis shows the following composition: C, 58.20; H, 2.70; N, 36.37; O, 2.72.

The 18% weight loss in formation of this polymer occurs from 175–250° C. There is no further loss in weight from 250° to 500° C. This exceptional stability contrasts with the poor stability of the black polymers of tetracyanoethylene reported by Berlin, Proc. Acad. Sci. U.S.S.R. 140, 899 (1961). These polymers, formed at 200° C. from tetracyanoethylene in the presence of basic catalysts (such as pyridine), were completely destroyed by heating in a vacuum to 500° C.

When the present polymer is heated from 25° to 500° C. in nitrogen in a thermogravimetric analysis apparatus, a weight loss of 5.5% occurs from 50° to 125° C. and a further loss of 13.5% from 375° to 500° C. The residue is a shiny black solid with the composition: C, 54.35; H, 2.33; N, 36.72; O, 5.98.

Example 14

This reaction illustrates pyrolysis of the reaction product of trimethylamine and bromomalononitrile.

A sample of the trimethylamine-tetracyanoethylene charge transfer complex is heated in a sublimator at 175–220° C. under pressures of 0.3–0.5 mm. over a period of 3¾ hours. A material volatilizes out which condenses as solid yellow crystals M. 178–183°. This compound has an infrared spectrum showing absorption corresponding to CN. The residue consists of yellow material which does not melt at up to 270°, which is a stable polymer like that of the preceding example.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. The method of producing a cyanocarbon amine compound which comprises contacting a halomalononitrile, the halogen substituent of which is selected from the class consisting of chlorine and bromine, with a tertiary amine.

2. The method of claim 1 in which said tertiary amine is an aromatic heterocyclic amine.

3. The method of producing a tetracyanoethylene adduct with a tertiary amine which comprises contacting bromomalononitrile with an aromatic N-heterocyclic tertiary amine.

4. The method of producing a tetracyanoethylene adduct with a tertiary amine which comprises contacting bromomalononitrile with pyridine and recrystallizing the resulting reaction product from water.

5. The method of producing a tetracyanoethylene adduct with a tertiary amine which comprises contacting bromomalononitrile with a tertiary aliphatic amine in the presence of a weak base.

6. The method of producing a tetracyanoethylene adduct with a tertiary amine which comprises contacting bromomalononitrile with triethyl amine in the presence of a weak base and recrystallizing the resulting reaction product.

7. The method of producing a tetracyanoethylene adduct with a tertiary amine which comprises contacting bromomalononitrile with a tertiary aliphatic amine and mixing the resulting reaction product with an aqueous solution of a strong base.

8. The method of producing a tetracyanoethylene adduct with a tertiary amine which comprises contacting bromomalononitrile with trimethylamine, mixing the resulting reaction product with an aqueous solution of a strong base, and recrystallizing the resulting reaction product from an organic solvent.

No References Cited

JOSEPH L. SCHOFER, Primary Examiner.

J. KIGHT, III, Assistant Examiner.

U.S. Cl. X.R.
260—2, 269, 465.5, 465.8